United States Patent [19]

Manico et al.

[11] Patent Number: 5,520,544

[45] Date of Patent: May 28, 1996

[54] TALKING PICTURE ALBUM

[75] Inventors: Joseph A. Manico, Rochester; Dale F. McIntyre, Honeoye Falls, both of N.Y.

[73] Assignee: Eastman Kodak Company, Rochester, N.Y.

[21] Appl. No.: 411,138

[22] Filed: Mar. 27, 1995

[51] Int. Cl.⁶ ........................................... G09B 5/00
[52] U.S. Cl. .................. 434/317; 434/308; 281/31; 40/455
[58] Field of Search ........................ 434/317, 308, 434/309, 318; 40/455, 427, 436, 445, 446, 455, 457, 463, 465, 156; 281/15.1, 29, 31; 206/578, 472, 473

[56] References Cited

U.S. PATENT DOCUMENTS

| | | |
|---|---|---|
| 3,220,126 | 11/1965 | Gabrielsen . |
| 3,857,191 | 12/1974 | Sadorus . |
| 4,138,057 | 2/1979 | Atalla . |
| 4,299,041 | 11/1981 | Wilson . |
| 4,373,918 | 2/1983 | Berman ................................ 434/309 |
| 4,418,278 | 11/1983 | Mondshein . |
| 4,434,567 | 3/1984 | LeVeau ................................ 434/309 |
| 4,636,881 | 1/1987 | Brefka et al. . |
| 4,748,756 | 6/1988 | Ross . |
| 4,791,741 | 12/1988 | Kondo . |
| 4,809,246 | 2/1989 | Jeng . |
| 4,884,974 | 12/1989 | DeSmet . |
| 4,990,092 | 2/1991 | Cummings . |
| 5,063,698 | 11/1991 | Johnson et al. . |
| 5,167,508 | 12/1992 | McTaggart . |
| 5,277,452 | 1/1994 | Skidmore ............................. 281/31 |
| 5,290,190 | 3/1994 | McClanahan . |
| 5,313,235 | 5/1994 | Inoue et al. . |
| 5,359,374 | 10/1994 | Schwartz . |

*Primary Examiner*—Richard J. Apley
*Assistant Examiner*—Glenn E. Richman
*Attorney, Agent, or Firm*—Peter J. Bilinski

[57] ABSTRACT

A picture or photo album is provided with an audio module for recording (optionally), storing and playing back audio messages associated with the pictures contained thereby. The audio module responds to predetermined control signals indicating that the album has been opened to a particular page to automatically play back a prerecorded message associated with the information displayed on that page. Such control signals are produced by different combinations or codes of output signals provided by a plurality of photodetectors mounted in the album cover. Radiant energy emitted by one or more light sources, also mounted in the album cover, is optically coupled to the photodetectors by light pipes mounted on or integral with each album page. As each album page is turned, the light pipe on that page de-couples the light source from a photodetector, thereby changing the output code of the photodetectors. According to a preferred embodiment, user-activated light source/photodetector pairs are disposed at spaced locations in the album cover to provide the user with a means for indicating to an audio control system which one of a plurality of different pictures on the same page calls for the playback of an audio message.

24 Claims, 10 Drawing Sheets

|  | D1 | D2 | D3 | D4 | D5 | D6 |
|---|---|---|---|---|---|---|
| PAGE 1 | f1+f2 | f2+f3 | f3+f4 | f4+f5 | f5+f6 | f6+f1 |
| PAGE 2 | f1+f2 | f2+f3 | f3+f4 | f4+f5 | f5+f6 | f6 |
| PAGE 3 | f1+f2 | f2+f3 | f3+f4 | f4+f5 | f5+f6 | 0 |
| PAGE 4 | f1+f2 | f2+f3 | f3+f4 | f4+f5 | f5 | 0 |
| PAGE 5 | f1+f2 | f2+f3 | f3+f4 | f4+f5 | 0 | 0 |
| PAGE 6 | f1+f2 | f2+f3 | f3+f4 | f4 | 0 | 0 |
| PAGE 7 | f1+f2 | f2+f3 | f3+f4 | 0 | 0 | 0 |
| PAGE 8 | f1+f2 | f2+f3 | f3 | 0 | 0 | 0 |
| PAGE 9 | f1+f2 | f2 | 0 | 0 | 0 | 0 |
| PAGE 10 | f1+f2 | 0 | 0 | 0 | 0 | 0 |
| PAGE 11 | f1+f2 | 0 | 0 | 0 | 0 | 0 |
| PAGE 12 | f1 | 0 | 0 | 0 | 0 | 0 |

THE TALKING ALBUM HAS BEEN OPENED, AUTOMATICALLY TURNING THE POWER ON.
→ EMITTERS BEGIN SENDING SIGNALS, SUCH AS PULSED IR RADIATION.
→ THE DETECTORS RECEIVE SIGNALS FROM THE EMITTERS.
→ WHEN SIGNALS, RELAYED BY THE DETECTORS, ARE STABLE, MICRO PROCESSOR INTERPRETS SIGNALS AND DETERMINES WHICH PAGE HAS BEEN OPENED (TOP OF STACK).
→ IS THE ALBUM OPENED TO PAGE 1?
- YES → PLAYBACK AUDIO PORTION ASSOCIATED WITH PAGE ONE. → USER TURNS PAGE → (back to detectors receive signals)
- NO → IS THE ALBUM OPENED TO THE LAST PAGE?
  - YES → NO PAGE DETECTED, LAST PAGE ASSUMED. → PLAYBACK AUDIO PORTION OF PREVIOUS PAGE AND STOP.
  - NO → PLAYBACK AUDIO PORTION OF PREVIOUS PAGE FROM TOP OF STACK (LEFT SIDE PAGE). → TIME DELAY, FIXED OR SET BY USER. → PLAYBACK AUDIO PORTION FOR TOP OF STACK (RIGHT SIDE PAGE). → USER TURNS PAGE

TALKING PICTURE ALBUM

BACKGROUND OF THE INVENTION

1. Field of the Invention

The present invent relates to improvements in picture displaying apparatus, such as picture or photograph albums and the like. More particularly, it relates to improvements in picture albums of the type that embody an audio module for providing an audio message related to picture being viewed by the album user.

2. Discussion of Prior Art

With the advent of microelectronics, integrated circuits, sound-recording microchips, etc., smaller and smaller sized consumer products are incorporating electronic audio devices to enhance their usefulness. For example, "talking" picture books and greeting cards are now available that automatically provide voice messages when they are opened. Typically, these voice messages are associated with and augment the graphic or pictorial information displayed in these products. See, e.g., the respective disclosures of U.S. Pat. Nos. 5,290,190 and 5,063,698. A variation on the voice message theme is the sound-illustrated music book disclosed in U.S. Pat. No. 4,809,246. Such a book comprises a loose-leaf binder containing a plurality of sheets or pages of music, and an integral sound-producing circuit which is adapted to play the music appearing on the particular page to which the book has been opened. A photoelectric circuit operates to produce a digitally encoded signal representing the open page number. This circuit comprises a linear array of spaced photo resistors disposed on a pivotally mounted flap of material. The book user is required to manually position the photo resistor array to underlie a pattern of holes formed along the edges of each music sheet. Each sheet has a different hole pattern and the photo resistor array detects ambient light passing through the hole patterns to produce a binary output signal representing the sheet or page directly on top of the array.

While photoelectric circuits of the type described above are robust and relatively reliable in sensing a particular page number in a book of such pages, they do require user involvement (i.e., a manual step) in order to operate. In many applications, this manual step is undesirable in that it requires that a user be instructed as to how to operate the book. In some cases it is desirable that a "talking" book or album operate entirely automatically so that a user need only open the book or album to a desired page, e.g. where a picture of interest is located, and the book automatically plays back a pre-recorded message associated with that page. Also, it would be desirable that a user can signal the audio device to play a particular message associated with one of a plurality of messages on a given page by simply pointing a finger at the picture of interest. Further, in the case of a photo album, it is desirable that a "talking" version retain the overall aesthetics, feel and operation of a conventional photo album.

SUMMARY OF THE INVENTION

In view of the foregoing discussion, an object of this invention is to provide a "talking" book, in particular a talking picture or photo album, which provides all of the above-mentioned desired features, i.e., one that requires no operator involvement in determining the page to which the album has been opened, one that requires minimal operator involvement in signaling an internal audio module device which of a plurality of pictures appearing on a particular page is of interest in terms of having a stored audio message associated therewith played back, and one that retains the overall appearance and operation of a conventional picture album.

Briefly, in accordance with a preferred embodiment, the talking album of the invention comprises the following components:

(a) a binder for retaining a stack of picture album pages, each of such album pages being adapted to support a picture provided by a user, such binder having front and rear covers and means for binding a stack of photo album pages located between the covers along one edge thereof so that a user may open the album to any desired page and view a picture supported thereby;

(b) an audio module operatively associated with the binder, the audio module being adapted to record and store a plurality of individual audio messages, e.g., one message for each album page, and in response to a predetermined control signal, to playback an audio message associated with a desired page to which the album has been opened; and (c) control means for automatically producing the predetermined control signal in response to the album being opened to the desired page. Preferably, the control means comprises a radiant energy source and a plurality of radiant energy detectors disposed in the binder cover, each of such radiant energy detectors being adapted to produce an output signal upon being irradiated, an optical conduit operatively associated with each of the album pages for optically coupling the radiant energy source and detectors only when an associated album page is disposed atop the album's rear cover, and decoding means responsive to a unique combination of radiant energy detector output signals for producing the predetermined control signal.

Preferably, the album further comprises a pair of switches, one for energizing the radiant energy source in response to the front cover being opened, and one for signaling the logic and control means which side of an open album page is of interest in terms of having an audio message played back. Further preferred is that the binder comprises means by which a user may readily signal the logic and control means, e.g., by pointing one's finger, that a particular one of a plurality of pictures on a page is of interest in terms of having an audio message played back.

The invention and its various advantages will become more apparent from the ensuing detailed description of preferred embodiments, reference being made to the accompanying drawings wherein like reference characters denote like parts.

DETAILED DESCRIPTION OF PREFERRED EMBODIMENTS

Figure 1:
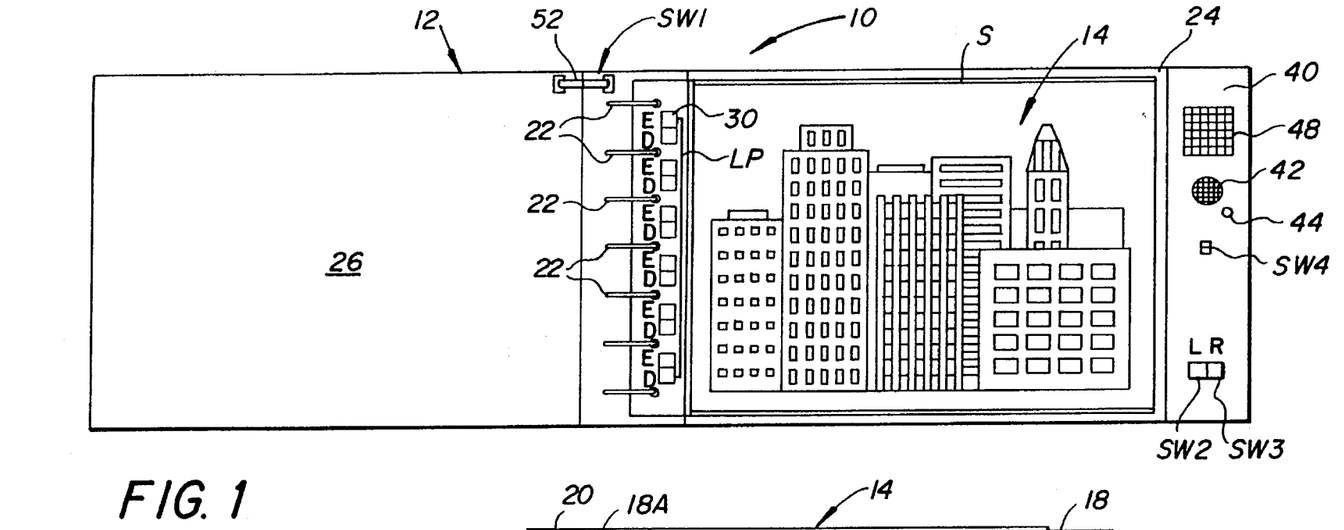
FIG. 1 is a top plan view of a picture album embodying the present invention.
Figure 2A:
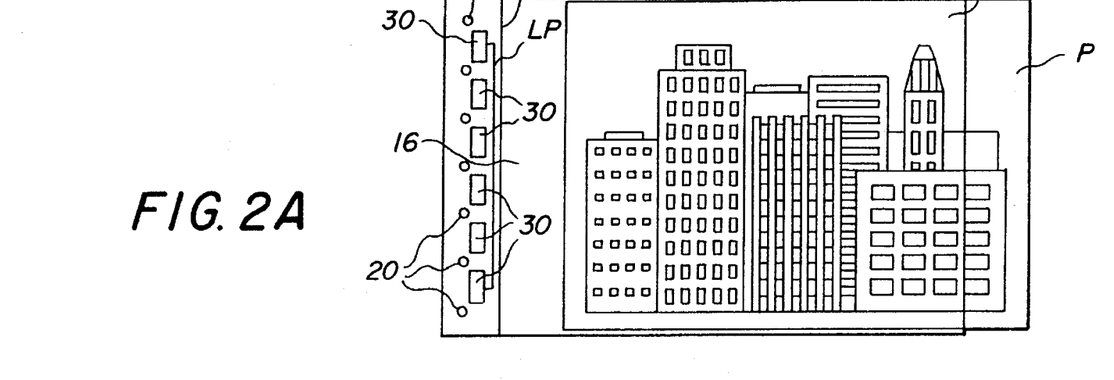
FIGS. 2A–2C are top plan views of three different album pages.

Referring now to the drawings, FIG. 1 illustrates a picture album 10 comprising a binder 12, preferably of the "loose-leaf" type, which is adapted to releasably retain a plurality of album pages 14 arranged in a stack S, only the top album page being shown in the drawing. As in most conventional picture albums, each album page includes, as best shown in FIG. 2A, a sheet of paper or cardboard stock 16 which serves as the background against which one or more pictures or photographs P are to be displayed, and some means for retaining or capturing such picture(s) at a desired location on the page. Typically the picture-retaining means takes the form of a rectangularly shaped transparent plastic sheet 18 which overlies the picture and is bonded at one edge 18A to the background sheet. In virtually all such albums, the picture-retaining means is disposed on both sides of the album page so that multiple pictures may be displayed on each page, at least one picture on the album page's front side, and one picture on its back or reverse side.

Figure 2B:
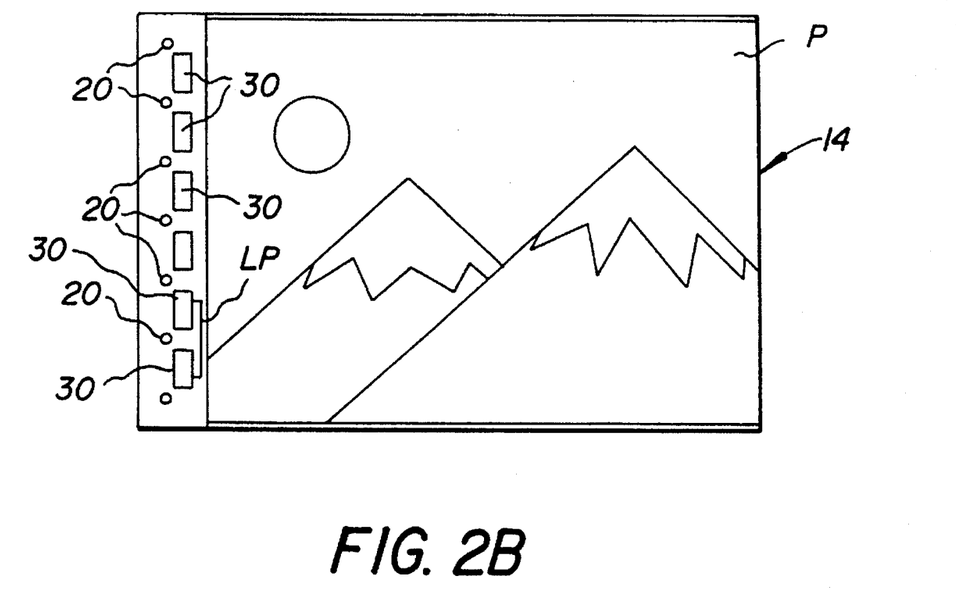
Figure 2C:
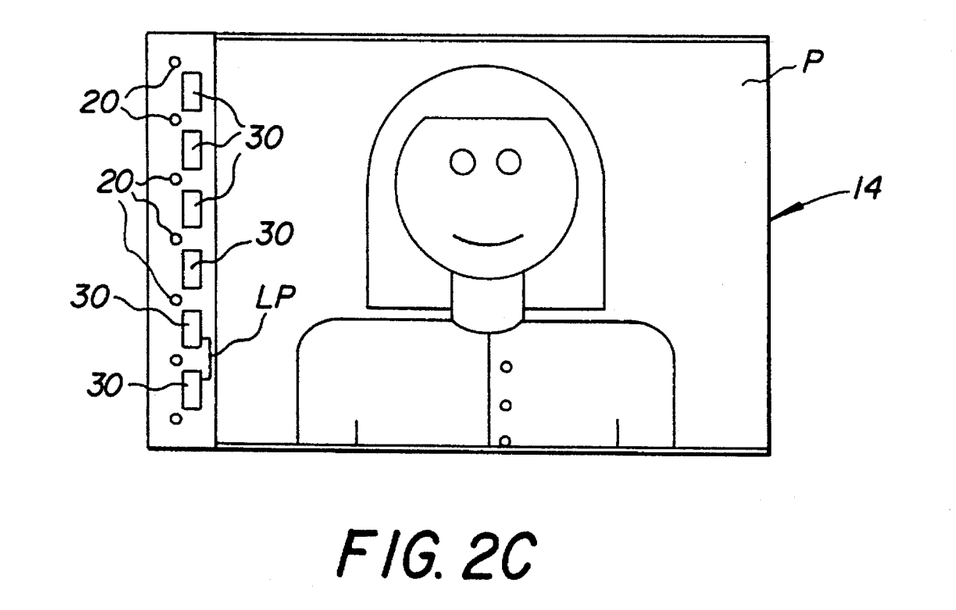

In addition to the picture retaining means discussed above, each album page 14 is further provided with a plurality of circular apertures 20 which are adapted to receive a like plurality of binder rings 22. The binder rings act, in a conventional manner, to releasably retain the stack of album pages in the binder and allow the pages to be readily turned from a position overlying the back cover 24 of the binder, to a position overlying the binder's front cover 26, whereby pictures retained on the front and back sides of each page may be presented for viewing. Further, in accordance with the present invention, each album page includes a plurality of transparent windows 30 which, for reasons described below, overlie a like plurality of radiant energy emitters E, preferably light-emitting diodes (LED's) and photodetectors D mounted in the back cover of the binder. As explained below, the radiant energy emitters and photodetectors are part of a photoelectric circuit which functions to automatically detects the album page number(s) to which the album has been "opened" by the user. As used herein, the word "open" refers to turning or sliding the binder's front cover and any number of album pages about the binder rings from a position overlying the back cover to a position spaced therefrom, such as to a position to the left side of the back cover. Further in accordance with the present invention, each album page has a conventional optical conduit or "light pipe" LP mounted thereon. As shown in the three individual album pages of FIGS. 2A–2C, the light pipe on each page is arranged and adapted to optically couple radiant energy emitted by one of the emitters and propagating through one of the page windows 30, to one of the other windows 30 on the same page. The light pipe also serves to redirect the coupled radiant energy in the opposite direction through such other window towards one of the photodetectors. Thus, by means of these light pipes, radiant energy emitted by one of the emitters E mounted in the binder cover and passing through the aligned windows disposed atop such emitter will be optically coupled to a photodetector underlying the aligned windows in another portion of the album.

Figure 3A:
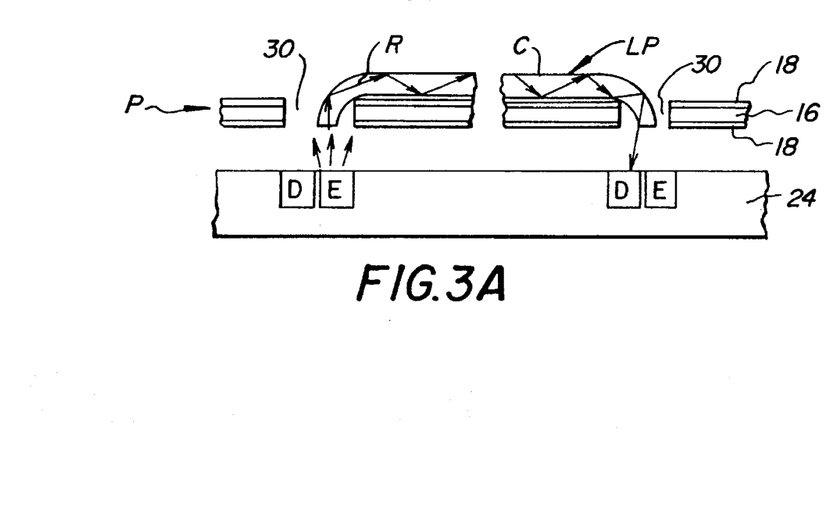
FIGS. 3A and 3B are enlarged views of the light pipe portion of the album pages showing different embodiments.
Figure 3B:
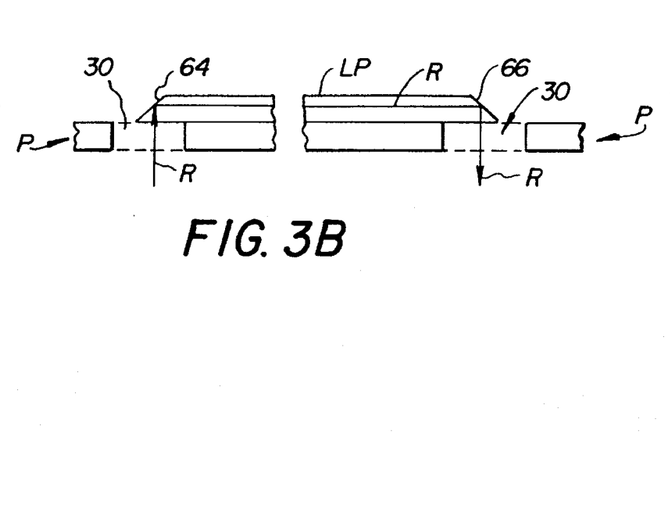

Referring to FIG. 3A, each of the light pipes LP comprises a flexible transparent plastic cylinder, preferably of circular or rectangular cross-section and having a diameter of between about 10 and 50 mils. Such devices, which are commercially available, for example, from Edmund Scientific Company, are adapted to transmit electromagnetic radiation R between opposing ends by multiple internal reflections. The light pipes may be attached to the album page by an adhesive, or may be embossed into the plastic picture-retaining sheet 18 so as to be integral therewith. The input and output ends of the light pipe may be molded so as to form a U-shaped structure, each leg of the "U" projecting through the page window 30 so as to receive radiation R from an emitter E in the album binder, or to direct radiation propagating through the light pipe towards a photodetector D spaced from the output end. Alternately, and more preferably, each of the light pipes may be rectilinear (i.e. straight) in shape and rectangular in cross-section with its respective input and output ends, E1 and E2, respectively, cut and polished at a 45 degree angle. As shown in FIG. 3B, radiation enters the light pipe through a transparent side wall, strikes the 45 degree surface of input end E1, and is directed along the length of the light pipe until it encounters the 45 degree surface of output end E2, whereupon the radiation exits the light pipe through its transparent side wall. In effect, the light pipe is an elongated prism which directs incident radiation in a direction opposite that from which it was received.

As briefly noted above, binder 12 includes a front cover 24, a rear cover 26 and an interconnecting spine 32. Incorporated in the back cover (though just as easily incorporated in the front cover) is an audio module 40 which, in response to the album being opened to a particular album page or pages, provides audio information (e.g., a voice message or music) associated with the displayed picture on that page or on those pages.

Figure 6:
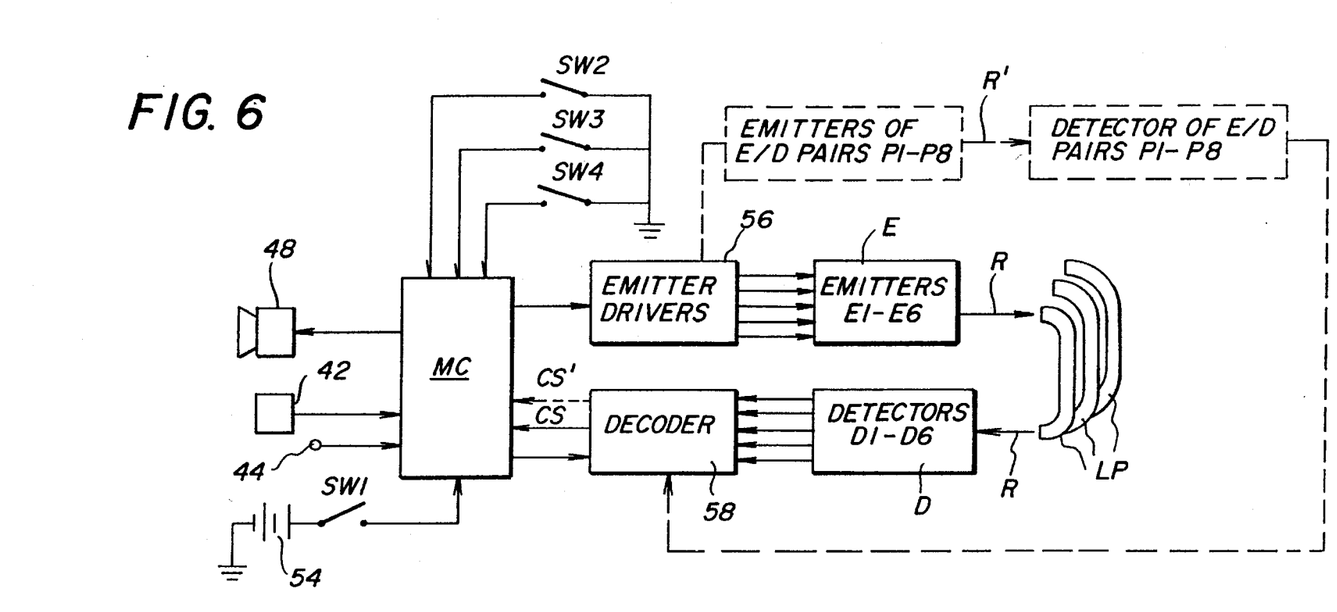
FIG. 6 is a schematic diagram of electronic components used in the talking picture album of the invention.

The audio module, which is best shown in the system block diagram of FIG. 6, includes a microphone 42 and audio input jack 44 for inputting audio information to a conventional audio record/playback device (shown schematically in FIG. 6), and an audio loud speaker 46 for broadcasting the recorded message. The audio record/playback device is preferably of the solid state variety and includes a programmable microcontroller MC of the type comprising an integral audio integrated circuit (IC) memory chip. A preferred controller is one of the family of "Single-Chip Voice Record/Playback Devices", such as the Series 1100, made and sold by Information Storage Devices, San Jose, Calif. A power switch SW1 having a switch actuator 52 connected between the binder's cover and spine, operates to connect and disconnect electrical power between the audio module and an internal D.C. power supply 54 whenever the front cover is opened or closed, respectively. When switch SW1 is closed, an audio message is automatically played, the message content being dependent on the page to which the album has been opened. If at least one of the album pages has been turned so as to present for viewing the picture disposed on the rear side of the turned page as well as the picture appearing front side of the succeeding page (i.e., the page atop the stack of unturned pages), the audio module is programmed to first play the pre-recorded message associated with the rear side of the turned page, i.e., the picture appearing on the left side of the opened album, and then, preferably following a brief pause, play the pre-recorded message associated with the picture on the front side of the succeeding page, i.e., the picture appearing on the right side of the album. Switches SW2 and SW3 on the binder provide the user with a means for signaling the microcontroller to re-play either the left-side message or the right side message, respectively. A fourth switch SW4 on the binder serves to switch the record/playback device into a RECORD mode. The user may then record, in a conventional manner, voice messages related to the pictures contained in the album. These messages are stored in the integral memory chip and are programmed to be played back in response to receipt of a predetermined control signal CS.

In the RECORD mode, the same control logic used to determine what message to PLAY can be used to associate a recorded message with a page number or picture location. Thus, when the RECORD switch SW4 is closed, the message recorded will be assigned by the microcontroller to the page to which the album is opened, and, in the manner described below with reference to FIG. 8, to a particular picture on a page identified by the album user. An individual sound "snippet" can be down-loaded from a camcorder, still camera or audio recorder via input port 44, or it can be recorded through the microphone 42.

In addition to the recording/playback functions described above, the microcontroller of the audio module also operates to drive the aforementioned light emitters E at different frequencies, f1–fn, through a suitable driving circuit 48. Radiant energy transmitted by the emitters E is and detected by the photodetectors D and converted to a plurality of parallel output signals which are decoded, in a conventional manner, by a decoding circuit 58. The latter operates to detect the frequency components f1–f6 in the respective photodetector output signals. The decoder outputs a control signal CS having a signature characteristic (digital or analog) determined by the combination of inputs received from the photodetectors.

Figure 4:
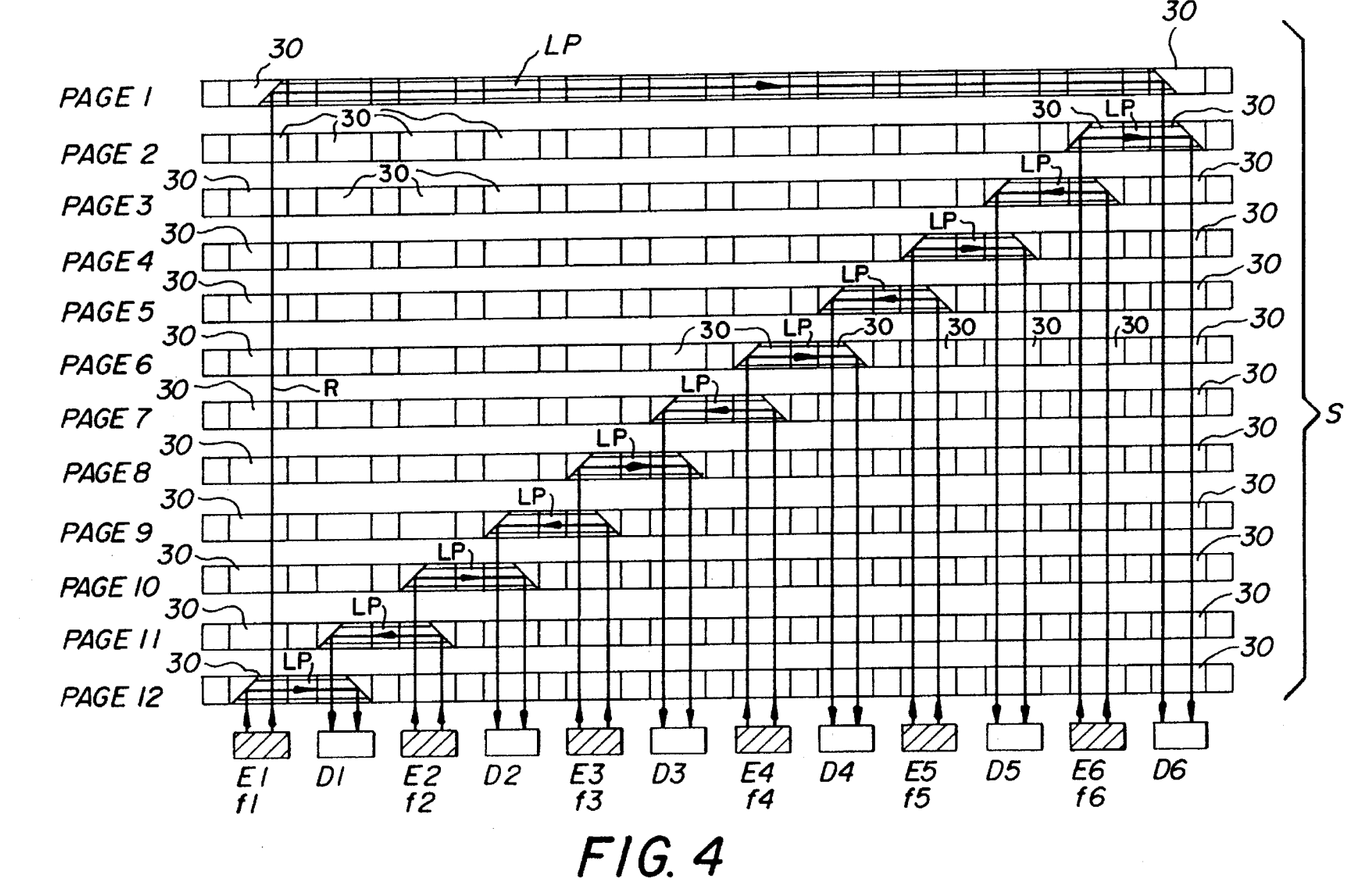
FIG. 4 is a cross-sectional illustration of a twelve page album embodying the invention.
Figure 5:
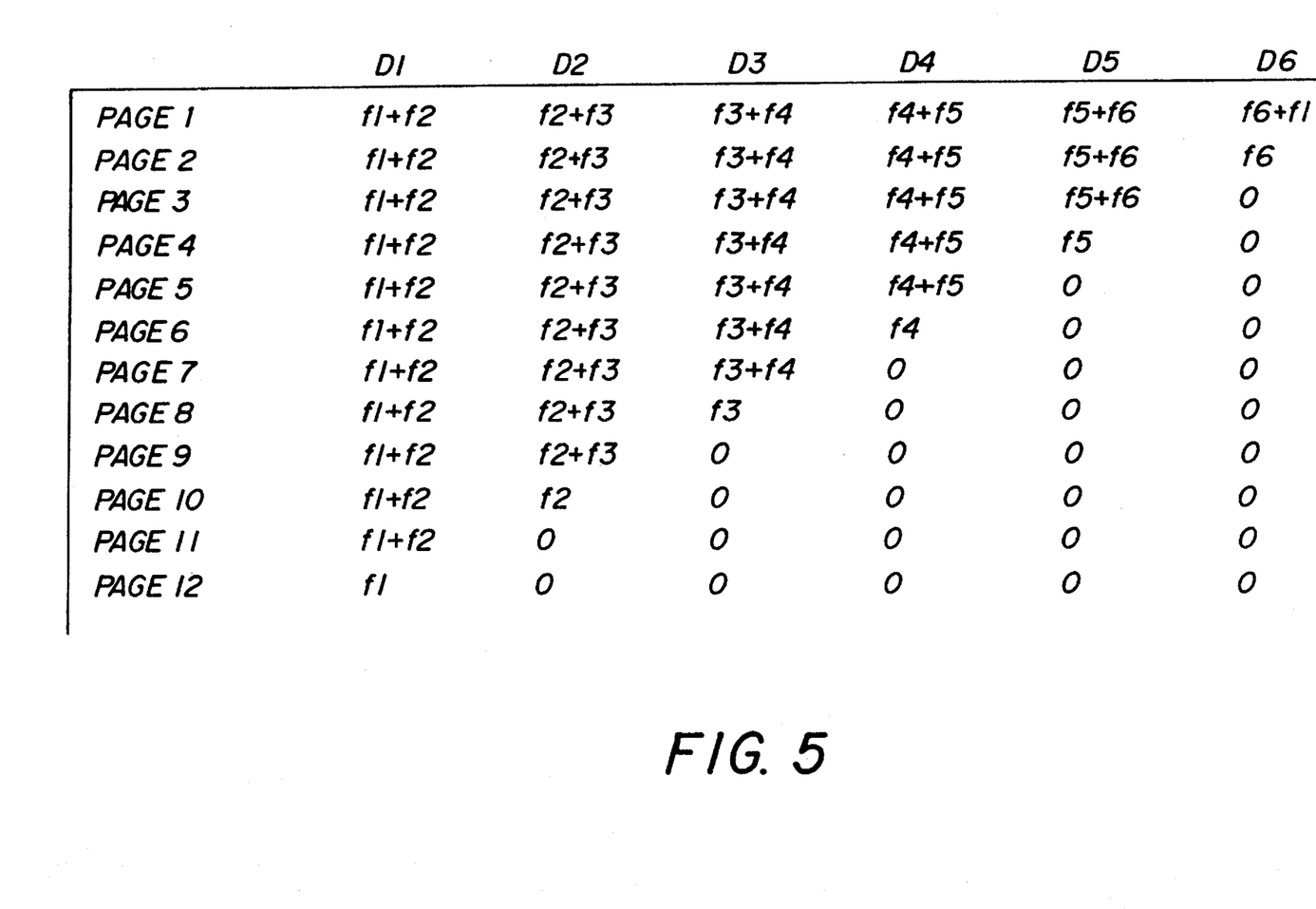
FIG. 5 illustrates different codes for ascertaining the page number to which the album has been opened.

Referring to FIGS. 4 and 5, the manner in which the audio module is signaled of the page number to which the album has been opened so that the appropriate message may be played back may be explained as follows: Twelve album pages are arranged in a stack S so that all of their respective transparent windows 30 are optically aligned atop the radiant energy-emitters E1–E6 and the photodetectors D1–D6. Radiant energy from the six emitters E1–E6 is frequency modulated at six different frequencies, f1–f6. Depending on the number of pages positioned atop the emitters/photodetectors, the photodetectors D1–D6 will produce output signals as represented in the chart of FIG. 5. For example, assuming the album is opened to page 7, i.e., pages 1–6 have been removed or flipped to a position overlying the opened album's front cover 26, the collective outputs of the photodetectors will be as follows: Detector D1 will produce a signal having frequency components f1 and f2, detector D2 will produce a signal having frequency components f2 and f3, and detector D3 will produce a signal having frequency components f3 and f4. None of the detectors D4, D5 and D6 will produce an output signal. Decoder 58 receives the respective outputs from the detectors, decodes the page number from frequency information provided, and outputs the control signal CS to the microcontroller indicating the open album page number. In response to this control signal, the audio module plays back the appropriate pre-recorded message.

Figure 7:
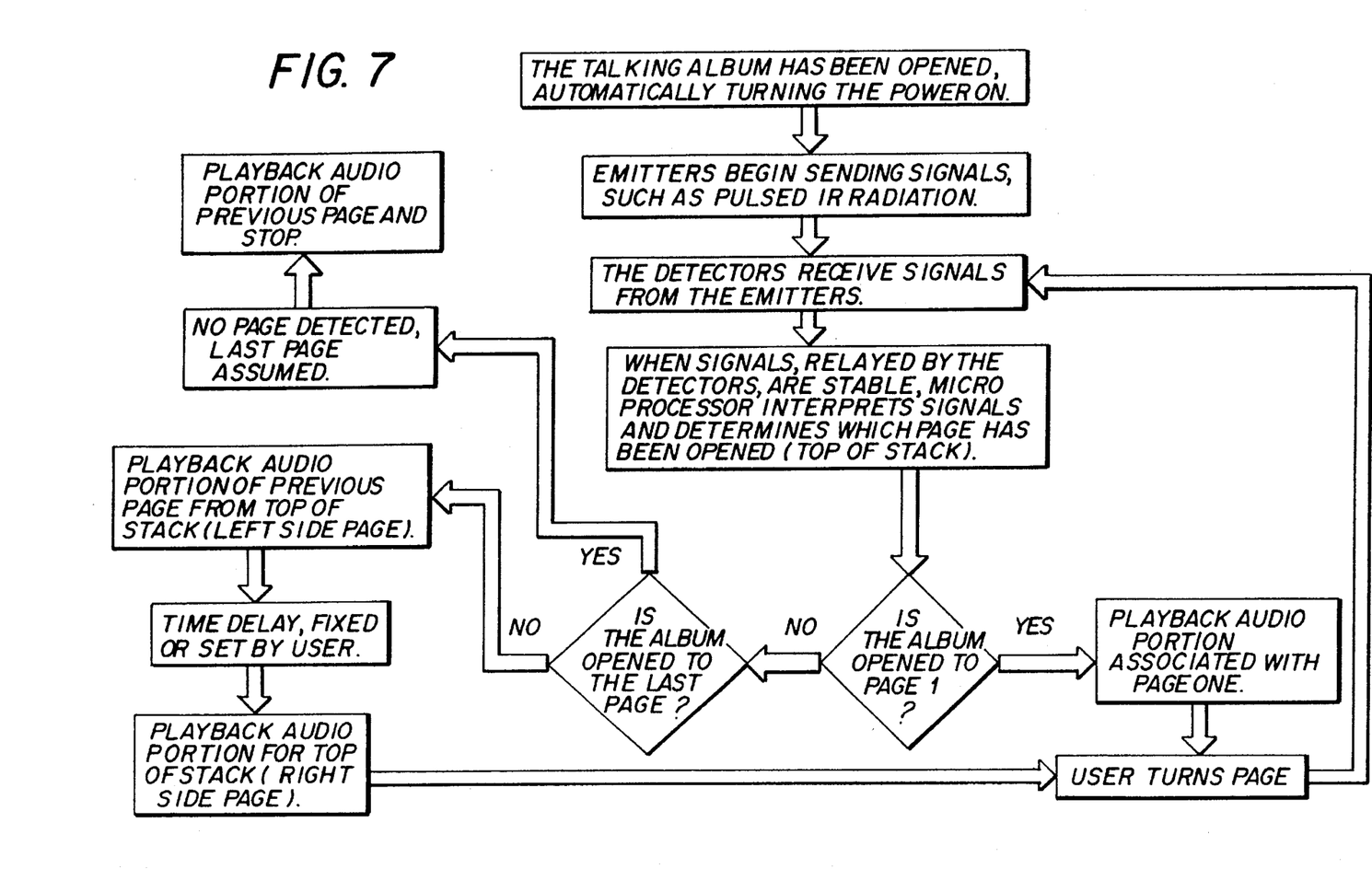
FIG. 7 is a flow chart illustrating the steps carried out by the microcontroller of the FIG. 6 apparatus.

In FIG. 7, the sequence of steps carried out by microcontroller MC is illustrated in flow chart form. Once the album has been opened and the power turned on, emitters E begin to transmit radiant energy, such as infrared radiation (IR). After a set time interval which allows the photodetector outputs to stabilize, the microprocessor (which is an integral part of the microcontroller) determines, from the characteristics of the control signal CS which page is on the top of the stack overlying the back cover of the binder. If the album is opened to page 1, the audio module plays that portion of the stored audio message associated with page 1. If the album is opened to the last page, that is, all pages have been turned to a position overlying the inside surface of the binder's front cover, the audio module plays the audio message associated with picture on the rear side of the last album page (which is now on the left side of the open album. If the album is opened to any other page, the audio module first plays back the message associated with the picture on the rear side of the preceding page, now the left side page, and then, following a preset time delay, plays back the audio message associated with the page on the top of the stack, i.e. the right side page. Whenever the user opens the album to a different page, this process is repeated.

Figure 8:
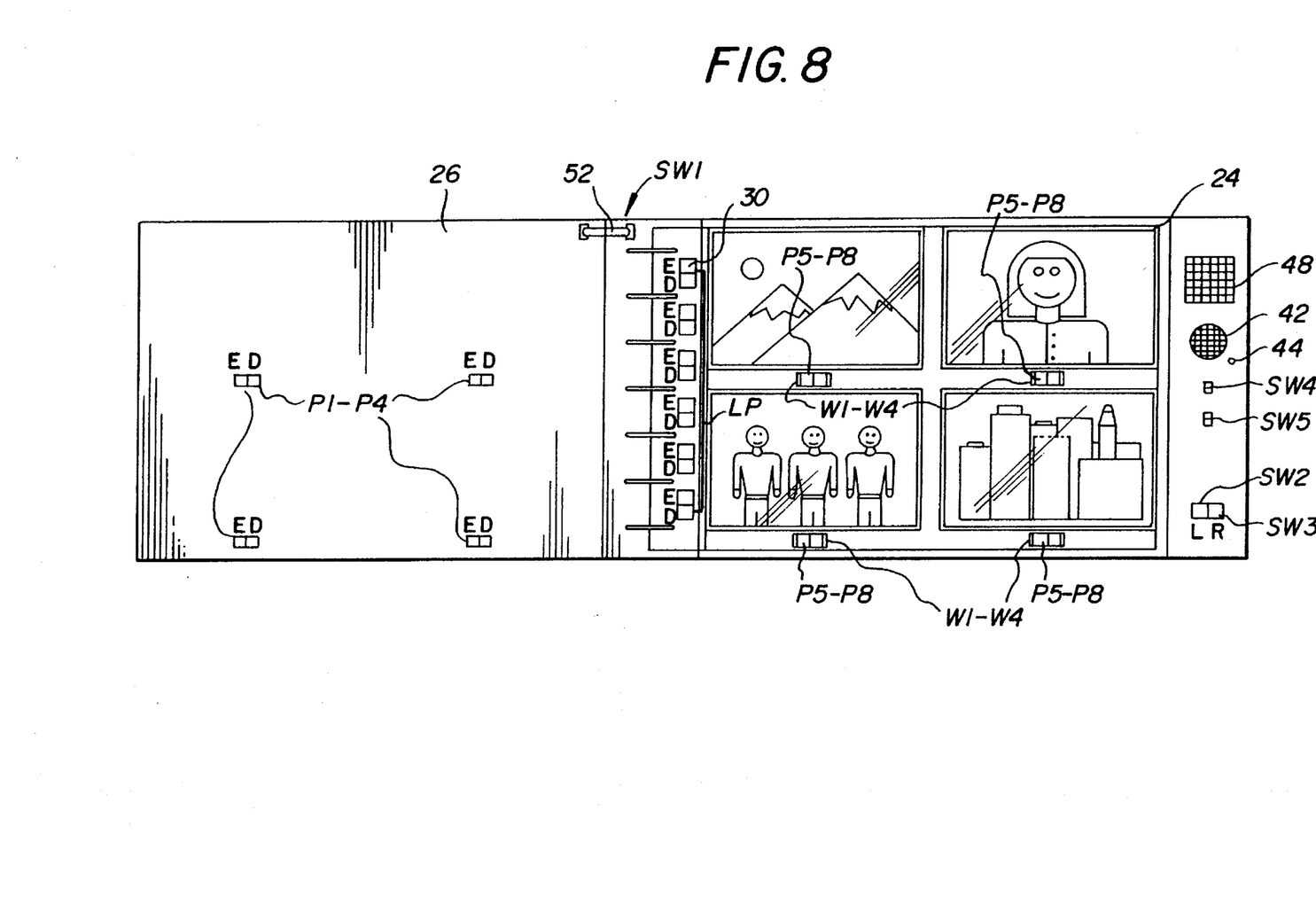
FIG. 8 is a top plan view of a picture album in which each of the pages supports multiple pictures.

In FIG. 8, the picture album described above has been modified by the addition of eight emitter/detector pairs P1–P8, each pair preferably comprising a light emitting diode (LED) and a photodetector. Further, each album page is modified to include four windows W1–W4 through which the emitter/detector pairs are visible when the pages are overlying either the front or back covers of the binder. As shown, each side of each page is adapted to retain four pictures, one being located directly above each of the windows W1–W4. As in the case of the aforementioned page-signaling emitters E1–E6, the emitters of each of the emitter/detector pairs P1–P6 are energized as the album is opened. The circuitry for driving the emitters of the emitter/detector pairs P1–P6 is shown in dashed lines in FIG. 6. To signal the logic and control means of the audio module (i.e., the microcontroller MC) which of the plurality of pictures (up to eight) on the one or two pages being viewed by the album user is of interest from the standpoint of having its associated prerecorded message played, the user merely places a finger or some other reflective object over the window located directly below the picture of interest. Radiation reflected from the user's finger will then irradiate the detector adjacent the emitter from which radiation is reflected, and thereby produce an output from such detector. This output signal is then fed to the decoder 58 which is adapted to detect which of the eight emitter/detector pairs has produced a signal. The decoder then produces one of eight different picture control signals CS' to the microcontroller which responds thereto to play the appropriate prerecorded message.

Figure 9:
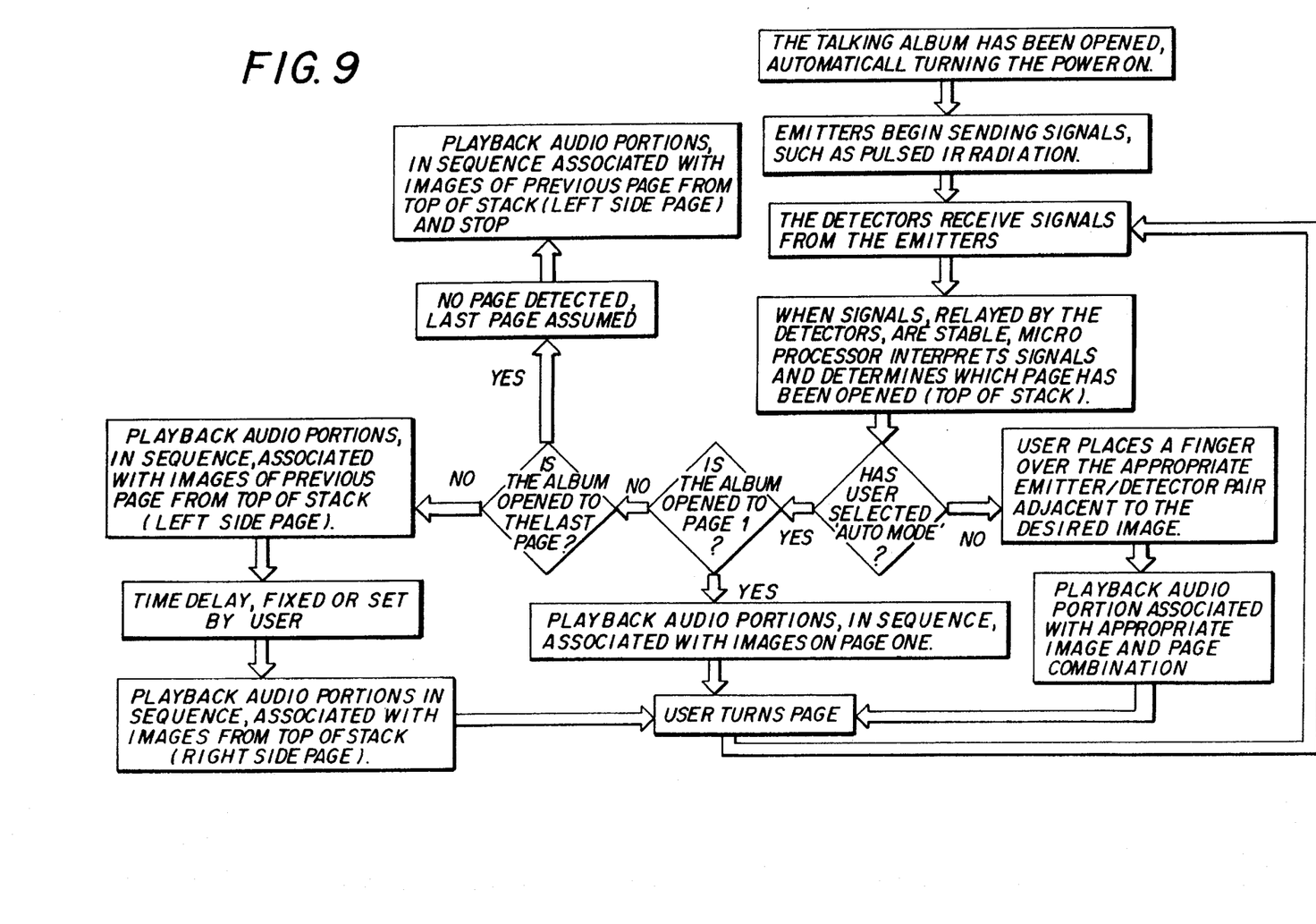
FIG. 9 is a flow chart illustrating the steps carried out by the microcontroller of the FIG. 6 circuitry in ascertaining which picture on a page requires that an audio message be played.

The flow chart of FIG. 9 illustrates a preferred sequence of steps carried out by the audio module's microcontroller in determining which of the pre-recorded messages to play at a given time. This process, which incorporates the above-described process for determining the page number, includes the step of first determining whether or not the user desires to operate the album in an "auto mode." A switch SW5 is provided on the binder to provide the microcontroller with this information. In the "auto mode" position, switch SW5 produces an output which causes the microcontroller to play back the recorded messages in a predetermined sequence, such as left side page first, starting with the picture in the top left corner, and ending with the picture in the lower right corner on the right side page. If the "auto mode" is not selected, the microcontroller awaits receipt of a control signal CS' produced by the user activating one of the emitter/detector pairs P1–P8, such as by placing a finger atop one of the windows W1–W4.

Figures 10, 11:
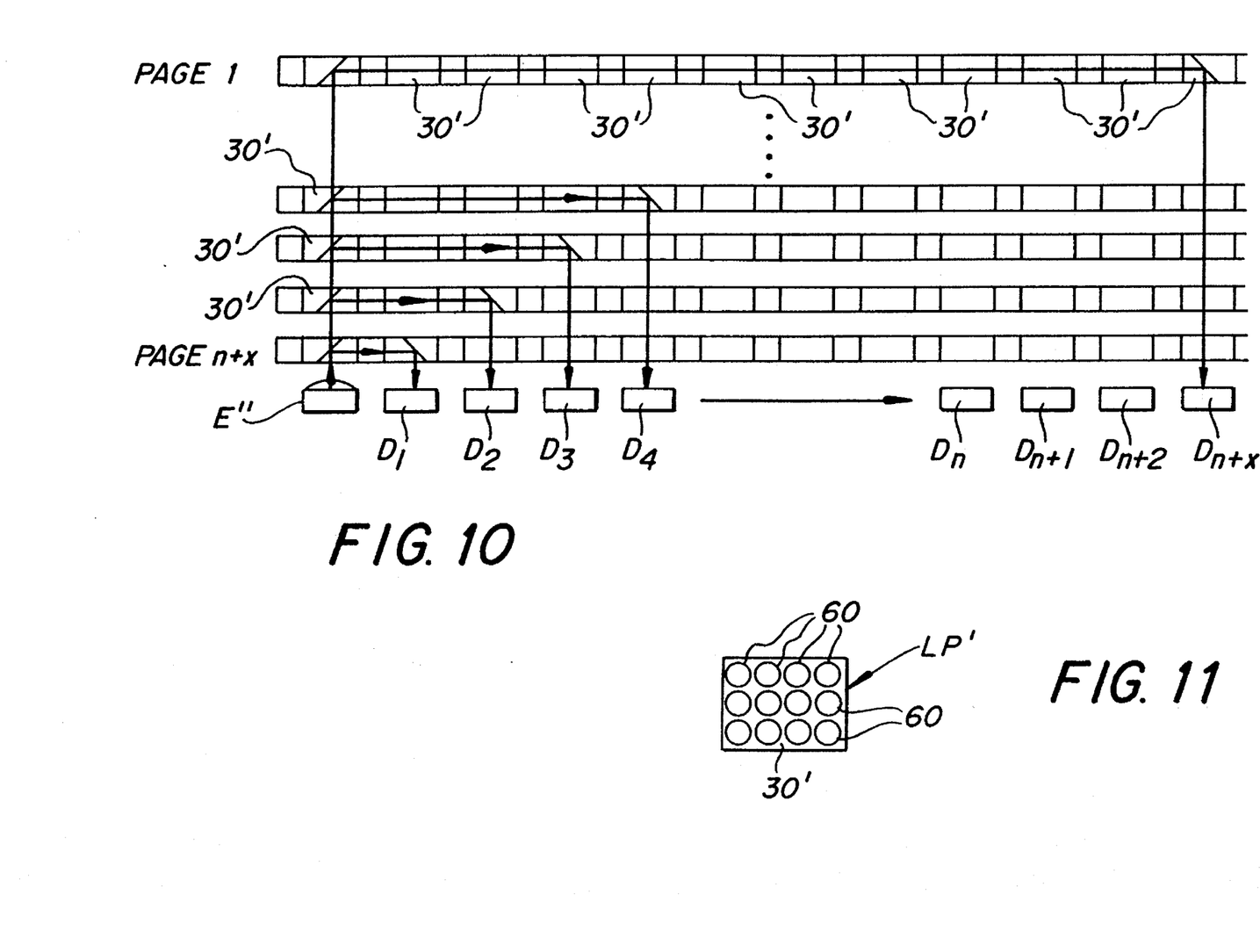
FIGS. 10–12 illustrate alternative techniques for determining the page to which the album has been opened.
Figure 12:
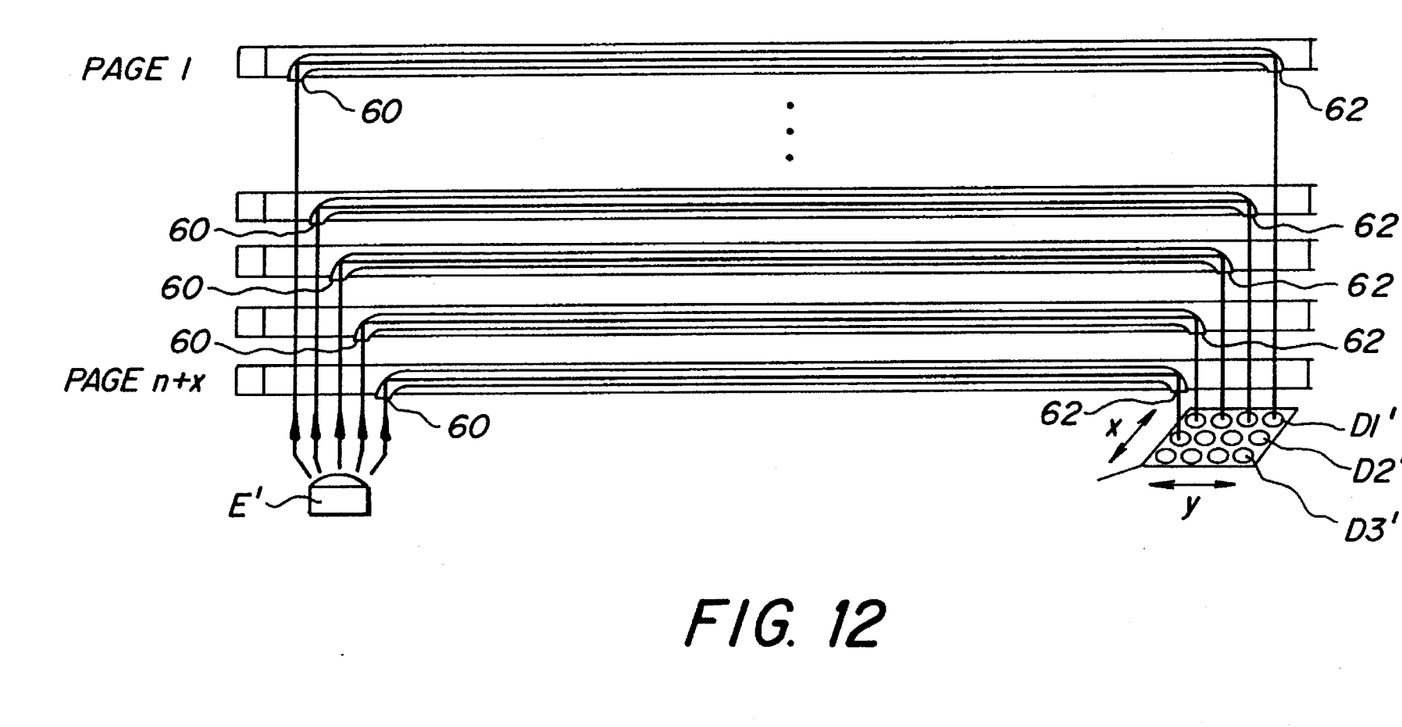

Alternative light pipe solutions for automatically determining the page number to which the album has been opened are shown in FIGS. 10–12. Referring to the cross-sectional illustration of FIG. 10, a single radiant energy emitter E' has been substituted for the six emitters E1–E6 of the FIG. 1–4 embodiment. The respective input ends 60 of all of the U-shaped light pipes are arranged in the same window 30' to be irradiated by the emitter E". An idealized pattern for the input ends of the light pipes is depicted in FIG. 11. This single emitter approach requires relatively precise positioning of the input ends to prevent one end from obscuring another. If the rectilinear type of light pipes is used (as shown in FIG. 3B), the 45 degree ends are semi-transparent so that emitted radiation received and reflected by each input end 60 is transmitted to the input end of the light pipe directly above it. This optical arrangement is shown in FIG. 10. The respective output ends 62 of the light pipes are assigned to a plurality of photodetectors, $D_1$–$D_{n+x}$, one photodetector for each album page. Compared to the embodiment described above with reference to FIGS. 1–5, this single emitter/multiple detector embodiment requires a higher energy emitter and somewhat longer light pipes LP' for optically coupling the emitter output with the multiple photodetectors A variation of the FIG. 10 approach is shown in FIG. 11 where the multiple individual photodetectors are arranged to form a single areal array of photodetectors D1', D2', D3', etc.

While the invention has been described with reference to particularly preferred embodiments, it will be apparent that various modifications can be made without departing from the spirit of the invention. Such modifications are intended to fall within the scope of the appended claims.

LIST OF REFERENCE CHARACTERS

10—Picture Album
12—binder
14—album pages
16—cardboard stock
P—pictures
18—plastic sheet
18A—edge of sheet
20—circular apertures
22—binder rings
24—binder's back cover
26—binder's front cover
30—windows
32—spine
40—audio module
42—microphone
44—input jack
48—loud speaker
52—switch actuator
54—power supply
56—emitter driver circuits
58—decoding circuit
60—input end of light pipe
62—output end of light pipe
P1–P8—emitter/detector pairs
E1—input end of light pipe
E2—output end of light pipe
CS—page control signal
CS—picture control signal
f—frequency
S—stack of pages
SW1—power switch
SW2—left page switch
SW3—right page switch
SW4—RECORD switch
SW5—auto mode control switch
E—radiant energy emitter
D—photodetectors
LP—light pipe
R—radiation
W1–W4—page windows

What is claimed is:

1. A talking photo album comprising:

(a) a binder for retaining a stack of photo album pages, each of said album pages being adapted to support a picture provided by a user, said binder having front and rear covers and means for binding a stack of photo album pages located between said covers along one edge thereof so that a user may open the album to any desired page and view a picture supported thereby;

(b) an audio module operatively associated with said binder; a means to selectively record and store a plurality of individual audio messages associated with each of said photo album pages, and in response to a predetermined control signal, to playback an audio message associated with a desired page to which the album has been opened; and (c) control means for automatically producing said predetermined control signal in response to said album being opened to said desired page, said control means comprising at least one radiant energy emitter and a plurality of radiant energy detectors disposed in said cover, each of said radiant energy detectors being adapted to produce an output signal upon being irradiated by radiation produced by said radiant energy emitter, an optical conduit operatively associated with each of said album pages for optically coupling said radiant energy emitter and detectors only when an associated album page is disposed atop the album's rear cover, and decoding means operatively coupled to said radiant energy detectors and responsive to a unique combination of radiant energy detector output signals for producing said predetermined control signal.

2. The apparatus as defined by claim 1 wherein said control means comprises a plurality of radiant energy emitters, and wherein the respective optical conduits on each page optically couple different radiant energy emitters to different radiant energy detectors when said pages are arranged in said stack.

3. The apparatus as defined by claim 2 wherein said radiant energy emitters emit radiant energy at different frequencies.

4. The apparatus as defined by claim 3 wherein said decoding means is responsive to said different frequencies in determining said unique combination of detector output signals.

5. The apparatus as defined by claim 1 wherein each of said pages has a plurality of transparent windows formed therein, said windows being located so as to be optically aligned with said radiant energy emitter and detectors when said pages are arranged in a stack atop said rear cover.

6. The apparatus as defined by claim 5 wherein said optical conduits are arranged to receive emitted radiant energy passing through one of said windows and to conduct such energy to another of said windows overlying one of said detectors.

7. The apparatus as defined by claim 1 further comprising means for energizing said radiant energy emitter in response to said front cover being opened.

8. The apparatus as defined by claim 1 wherein each of said album pages has front and back sides, each side being adapted to support a different picture, and wherein said binder comprises switching means for signaling said control means which side of an open album page is of interest in terms of having an audio message played back.

9. The apparatus as defined by claim 1 wherein each album page is adapted to support a plurality of pictures, and wherein said binder comprises means by which a user may signal said control means which picture on a page is of interest in terms of having an audio message played back.

10. The apparatus as defined by claim 9 wherein said signaling means comprises a plurality of radiant energy emitter/photodetector pairs mounted at spaced locations in said binder, and means defining a plurality of light-transparent openings in each album page opposite said emitter/photodetector pairs, whereby a user may signal which picture on a page is of interest in terms of having an audio message played back by selectively covering one of said page openings and thereby reflecting radiant energy from one of the emitters of said emitter/photodetector pairs to its associated photodetector to produce an output therefrom.

11. The apparatus as defined by claim 1 wherein said optical conduits are integrally associated with said album pages.

12. The apparatus as defined by claim 1 wherein said album pages comprise a plastic material, and wherein said optical conduits are integrally formed with said album pages.

13. A talking photo album comprising:
(a) a binder for releasably retaining a stack of photo album pages, each of said album pages being adapted to support a picture provided by a user, said binder having front and rear covers and means for binding a stack of photo album pages located between said covers along one edge thereof so that a user may open the album to any desired page and view a picture supported thereby;
(b) an electronic audio module mounted on a cover of said binder; a means to store a plurality of individual audio messages associated with each of said photo album pages, at least one message for each album page, and in response to a predetermined control signal, to playback said an audio message associated with the desired page to which the album has been opened; and
(c) control means for automatically producing said predetermined control signal in response to said album being opened to said desired page, said control means comprising at least one light source for producing a beam of radiant energy and a plurality of photodetectors disposed in said back cover, each of said photodetectors being adapted to produce an output signal upon being irradiated by said radiant energy, a light pipe operatively associated with each of said album pages, each of said light pipes being adapted to transmit light from an input end to an output end, said input end being located to receive radiant energy from said light source only when an associated album page is disposed atop the album's rear cover, said output end being disposed to irradiate one of said photodetectors with transmitted light only when said associated page is disposed atop said rear cover, and decoding means responsive to a unique combination of photodetector output signals for producing said predetermined control signal.

14. The apparatus as defined by claim 13 wherein said control means comprises a plurality of light sources, and wherein the respective light pipes on each page optically couple different light sources to different photodetectors when said pages are arranged in said stack.

15. The apparatus as defined by claim 14 wherein said light sources emit radiant energy at different frequencies.

16. The apparatus as defined by claim 15 wherein said decoding means is responsive to said different frequencies in determining said unique combination of photodetector output signals.

17. The apparatus as defined by claim 13 wherein each of said pages has a plurality of transparent windows formed therein, said windows being located so as to be optically aligned with said light source and photodetectors when said pages are arranged in a stack atop said rear cover.

18. The apparatus as defined by claim 17 wherein said light pipes are arranged to receive emitted radiant energy passing through one of said windows and to conduct such energy to another of said windows overlying one of said photodetectors.

19. The apparatus as defined by claim 13 further comprising means for energizing said light source in response to said front cover being opened.

20. The apparatus as defined by claim 13 wherein each of said album pages has front and back sides, each side being adapted to support a different picture, and wherein said binder comprises switching means for signaling said control means which side of an open album page is of interest in terms of having an audio message played back.

21. The apparatus as defined by claim 13 wherein each album page is adapted to support a plurality of pictures, and wherein said binder comprises means by which a user may signal said control means which picture on a page is of interest in terms of having an audio message played back.

22. The apparatus as defined by claim 21 wherein said signaling means comprises a plurality of radiant energy emitter/photodetector pairs mounted at spaced locations in said binder, and means defining a plurality of light-transparent openings in each album page opposite said emitter/photodetector pairs, whereby a user may signal which picture on a page is of interest in terms of having an audio message played back by selectively covering one of said page openings and thereby reflecting radiant energy from one of the emitters of said emitter/photodetector pairs to its associated photodetector to produce an output therefrom.

23. The apparatus as defined by claim 13 wherein said light pipes are integrally associated with said album pages.

24. The apparatus as defined by claim 13 wherein said album pages comprise a plastic material, and wherein said light pipes are integrally formed with said album pages.

* * * * *